(12) United States Patent
Tomshak et al.

(10) Patent No.: US 7,507,280 B2
(45) Date of Patent: Mar. 24, 2009

(54) PORTABLE DEGASSER, FLARE TANK AND FLUID STORAGE SYSTEM

(76) Inventors: Deren John Tomshak, #12 - 2135 32nd Avenue, North East, Calgary, Alberta (CA) T2E 6Z3; Michael Andrew Lehmann, # 12 - 2135 32nd Avenue, North East, Calgary, Alberta (CA) T2E 6Z3; Dean William Falkenberg, #12 - 2135 32nd Avenue, North East, Calgary, Alberta (CA) T2E 6Z3

( * ) Notice: Subject to any disclaimer, the term of this patent is extended or adjusted under 35 U.S.C. 154(b) by 585 days.

(21) Appl. No.: 11/342,614

(22) Filed: Jan. 31, 2006

(65) Prior Publication Data
US 2007/0175331 A1    Aug. 2, 2007

(51) Int. Cl.
*B01D 19/00* (2006.01)
(52) U.S. Cl. .............................. 96/204; 96/215; 96/220; 95/262; 55/356; 210/241
(58) Field of Classification Search .................... 96/204, 96/215, 220, 155; 95/262; 55/356; 210/241
See application file for complete search history.

(56) References Cited

U.S. PATENT DOCUMENTS

| 3,339,346 A | 9/1967 | Buchanan |
|---|---|---|
| 3,607,670 A | 9/1971 | King |
| 3,973,930 A | 8/1976 | Burgess |
| 4,271,927 A | 6/1981 | Brown et al. |
| 4,284,173 A | 8/1981 | Patterson |
| 4,819,955 A | 4/1989 | Cobb |
| 5,653,469 A | 8/1997 | Wade |
| 5,807,095 A * | 9/1998 | Gustafson et al. ............ 431/202 |
| 5,882,187 A * | 3/1999 | Gustafson et al. ............ 431/202 |
| 5,997,284 A * | 12/1999 | Gustafson et al. ............ 431/202 |
| 6,162,284 A | 12/2000 | Mitchell et al. |
| 6,193,786 B1 | 2/2001 | Henderson |
| 7,141,099 B2 * | 11/2006 | Ross et al. ..................... 96/155 |
| 2005/0166759 A1 * | 8/2005 | Ross et al. ..................... 96/155 |

FOREIGN PATENT DOCUMENTS

EP    355327 A2    2/1990

* cited by examiner

*Primary Examiner*—Duane S Smith
*Assistant Examiner*—Douglas J Theisen
(74) *Attorney, Agent, or Firm*—Antony C. Edwards

(57) ABSTRACT

A portable degasser, flare tank and fluid storage system for use during oil well exploratory drilling which when connected to the fluid blow-out prevention hardware of an active drilling operation prevents the accidental spillage of liquid ejected under pressure from the drill bore hole.

20 Claims, 8 Drawing Sheets

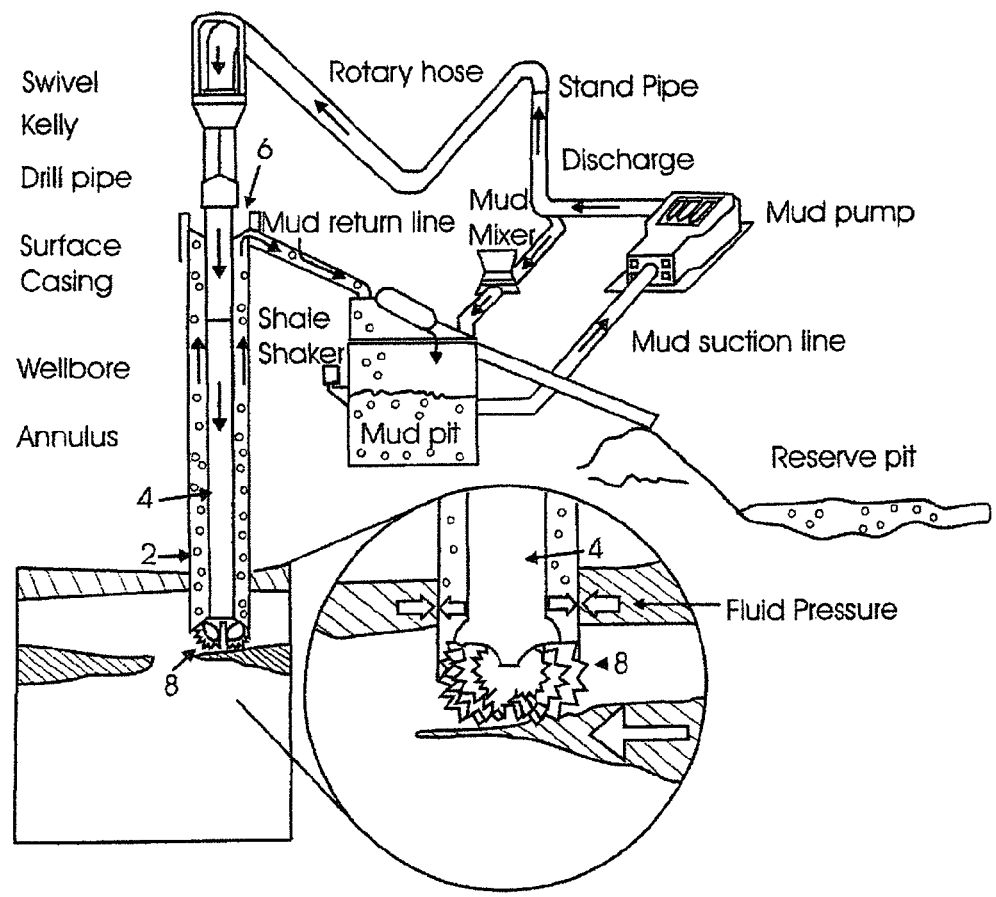
Prior Art   Fig 1

PORTABLE DEGASSER, FLARE TANK AND FLUID STORAGE SYSTEM

FIELD OF THE INVENTION

This invention relates to a portable degasser, flare tank and fluid storage system for use during oil well exploratory drilling which can be transported to a remote site and connected to fluid blow-out prevention hardware commonly associated with an active drilling operation to prevent the accidental spillage of any liquid ejected under pressure from a drill bore hole to the environment.

BACKGROUND OF THE INVENTION

As illustrated in FIG. 1, conventionally during the process of drilling, fluid 2 is pumped through the drill pipe 4 into the bore hole 6 for the purposes of cooling the drill bit 8 and packing or sealing the wall of the bore. It is common in the industry to use diesel fuel as an easily accessible and efficient fluid for this purpose. As drilling proceeds to depth a considerable volume of such fluid will be contained within the bore which is nominally 10 inches (254 mm) in diameter. Pockets of pressurized gas are normally encountered at intervals during the drilling process. If the fluid pressure of the gas exceeds the pressure of the drilling fluid 2, a so-called 'gas kick' will enter the bore hole 6 and the contents of the bore hole 6 including any diesel fuel/oil mixture or such other liquids commonly used in the industry, as well as fragments of rock, loose soil, etc. will be ejected as ejecta from the surface opening of the drill bore hole 6 under considerable pressure.

Environmental contamination is an obvious concern resulting from the expulsion of such mixture from the bore hole as is the health and safety of workers at the drilling site. Blow-out prevention hardware is commonly utilized near the ground surface surrounding the bore hole site to ameliorate such contamination and safety concerns. It is common practice for such hardware to simply contain and direct such expelled fluid by suitable pipe-work to nearby storage areas, which may simply be one or more shallow open pits excavated nearby. At suitable intervals the contents of these pits are ignited and volatile materials burnt off. It is obvious then that with this practice there is little regard of the recovery and subsequent re-use of the fluid used during the drilling process or for the burning of the volatile materials in an efficient manner.

The portable degasser, flare tank and fluid storage system of the present invention, once it has been situated in proximity to an exploratory drilling rig, may be more easily connected to the fixed length lines extending from the blow-out prevention hardware than was heretofore possible, without the need for accurate positioning of the portable degasser.

In the prior art the applicant is aware of U.S. Pat. No. 3,973,930 which issued Aug. 10, 1976 to Burgess for a Drilling Mud Degasser Apparatus and Method where a tank for receiving mud from a drilling operation incorporates a centrifugal separator mounted therein for separating gas, liquid and solids.

Further, the applicant is aware of U.S. Pat. No. 6,162,284 which issued Dec. 19, 2000 to Mitchell, Gladue and Corb for a Separator For Gasses, Liquids and Solids From a Well by directing ejecta from a bore hole 6 created by 'air drilling' and foam extraction, to a vortex for centrifugally separating gas, liquid and solids, thus permitting separated gas to be flared off, the solids to be disposed and the liquid to be reused in the further drilling process.

The applicant is also aware of U.S. Pat. No. 6,193,786 which issued Feb. 27, 2001 to Henderson for a Portable Oil Degasification Apparatus where oil containing a volatile dissolved combustible gas is infused with an inert gas having a lower equilibrium vapor pressure to transfer the combustible gas into the inert, then separating the volatile/inert gas combination from the oil.

The teaching in the prior art does not reduce the necessity for, and difficulty associated with, repositioning the degassing apparatus, which is heavy and thus only transported by means of heavy equipment, so that the fixed-length pipes extending from the blow-out prevention hardware on the drilling rig can be attached to the degassing apparatus.

SUMMARY OF THE INVENTION

The portable degasser, flare tank and fluid storage system of the present invention is an apparatus for receiving and separating returning gasses, liquids and solids from, for example, an oil well bore hole.

More specifically it pertains to mounting return gas flare lines, return liquid lines, a liquid degassing tank and a liquid/solid-receiving compartment within a readily portable framework, where the return gas flare lines, return liquid line and liquid degassing tank are reciprocally movable within the portable framework to enable these components to be easily repositioned relative to a well being drilled so that pipelines connecting prevention hardware on the drilling rig can be readily attached.

In summary, the portable degasser, flare tank and fluid storage system in accordance with one embodiment of the invention may be generally characterized as including:
 (a) an exterior supporting framework;
 (b) an open liquid/solid receiving compartment fixedly supported by the exterior supporting framework,
 (c) an open bottomed, generally cylindrical degassing tank mounted on upper and lower movable carriages which are carried by the supporting framework so as to be movable relative to an end of the framework, where the degassing tank is positioned generally medially of the open liquid/solid-receiving compartment and the open bottom is positioned within the compartment below it's open upper surface
 (d) return liquid lines for example generally four inches in diameter. connecting the degassing tank to blow-out prevention hardware on a drilling rig,
 (e) return gas flare lines for example generally eight inches in diameter, connecting a blow-out prevention hardware on the drilling rig to the exterior supporting framework, which are mounted on a movable carriage carried by the supporting framework and connected to the degassing tank carriage so as to be reciprocally movable therewith relative to an end of the framework,
 (f) actuation means fixedly mounted to an opposite end of the supporting framework having actuation cables or other actuation means connected to the degassing tank for fore and aft reciprocal movement of the degassing tank
 (g) a generally cylindrical degassing tank where liquid/solid-receiving lines are located in the upper portion of the tank and incoming liquid falls by gravity to contact downwardly sloping, inwardly projecting baffles fixed to the sides of the tank to agitate the liquid sufficiently to release entrained gases.

Stated another way, the present invention may be characterized as a degasser system for mounting to a pipe or pipes mounted to the blow-out outflow from a bore hole as to as to direct ejecta from the bore hole resulting from blow-out into the pipe, the system including: a rigid frame; an open-bottomed vessel mounted on the frame, wherein the vessel has a lower open end, contiguously sealed sidewalls extending upwardly from the lower open end, and an enclosed vessel head mounted to so as to seal an upper end of the sidewalls.

The vessel thus has an interior cavity defined by the sidewalls and the head; a stack mounted to and extending from the vessel head, the stack in fluid communication with the cavity so as to exhaust gas from the vessel; a pipe coupler mounted to the sidewalls adjacent the upper end thereof, the pipe coupler in fluid communication with the vessel cavity and mountable to the blow-out outflow pipe or pipes so as to direct the ejecta from the blow-out outflow pipe or pipes, when the pipe coupler is mounted to the pipe or pipes, in an in-flow direction into the cavity. The ejecta flows along a flow path under force of gravity down through the vessel in a downward direction and so as to flow out through the lower open end; at least one baffle mounted to the sidewalls and in the cavity so as to partially occlude the cavity and so as to lie at least partially across the flow path, whereby the ejecta flowing along the flow path is degassed; a tank mounted under the vessel so as to receive the ejecta flowing from the lower open end of the vessel whereby the ejecta is stored in the tank for later removal and disposal; and, means for translating the pipe coupler and the vessel relative to the frame so as to thereby translate the pipe coupler for ease of mounting to the blow-out outflow pipe or pipes.

The means for translating the pipe coupler and the vessel relative to the frame translates the vessel over, and relative to, the tank. The tank has an upwardly-open upper opening sized so that the vessel only translates over the opening. The tank may have sidewalls defining the upper opening into the tank, and the lower open end of the vessel is thus disposed over the upper opening between the sidewalls.

The frame may include rails, and the means for translating the pipe coupler and the vessel may include means for translating the vessel along the rails. The rails may include a spaced apart pair of substantially horizontal rails mounted on opposite sides of the vessel and the means for translating the vessel along the rails may include rolling means such as rollers, wheels, castors, bearings, etc. mounted to the vessel for rolling along the rails. The vessel may extend downwardly between the pair of substantially horizontal rails so as to dispose the lower open end below the rails.

The vessel has a range of translatory motion along the rails extending substantially entirely across the upper opening into the tank. A selective actuation means is provided for selectively translating the vessel along the rails. The selective actuation means may include at least one elongate element cooperating between the vessel and a prime mover mounted to the frame. The elongate element may include at least one cable and the prime mover may include at least one winch mounted to one end of the cable. An opposite end of the cable may be mounted to the vessel. The cable may be formed as a loop so as to function as a double-acting actuator moving the vessel back and forth along the rails.

The stack may be pivotally mounted over the head so as to be foldable between a stowed position adjacent the frame and a deployed position extending upwardly from the head. The pipe coupler may be pivotable at an end thereof so as to pivot for ease of mounting to the pipe.

The vessel may be elongate and mounted in the frame so as to be elongate vertically. The at least one baffle may be an array of baffles spaced apart along the flow path below the pipe coupler where mounted to the sidewalls. The pipe coupler may be mounted to the sidewalls adjacent the upper end of the sidewalls. The array of baffles may include a plurality of baffles which are alternatingly mounted to opposite walls of the sidewalls and so as to be interleaved along the flow path alternatingly in opposed facing array. The plurality of baffles may include at least three alternatingly opposed-facing downwardly inclined baffles interleaved so that distal ends of the baffles are interleaved along the flow path so that the flow path is circuitous through the baffles as the ejecta travels along the flow path through the array of baffles.

A blast plate may be mounted in the vessel so as to be in an in-flow of the ejecta flowing in the in-flow direction from the pipe coupler so as to receive a blast force of the ejecta and to deflect the ejecta along the flow path. The pipe coupler, where it is mounted to the vessel, may include a substantially horizontal pipe extension extending through the sidewalls into the cavity of the vessel. The sidewalls may be formed as an elongate cylinder extending from the head to the lower open end.

BRIEF DESCRIPTION OF THE DRAWINGS

FIG. 1 is a diagrammatic illustration of a prior art drilling system.

FIG. 3 is a front elevation view of the system of FIG. 1a.

FIG. 4 is a rear elevation view of the system of FIG. 1a.

FIG. 5 is a plan view of the system of FIG. 1a.

FIG. 6 is a plan view partially cut away of the system of FIG. 1a.

DETAILED DESCRIPTION OF EMBODIMENTS OF THE INVENTION

Figure 1A:
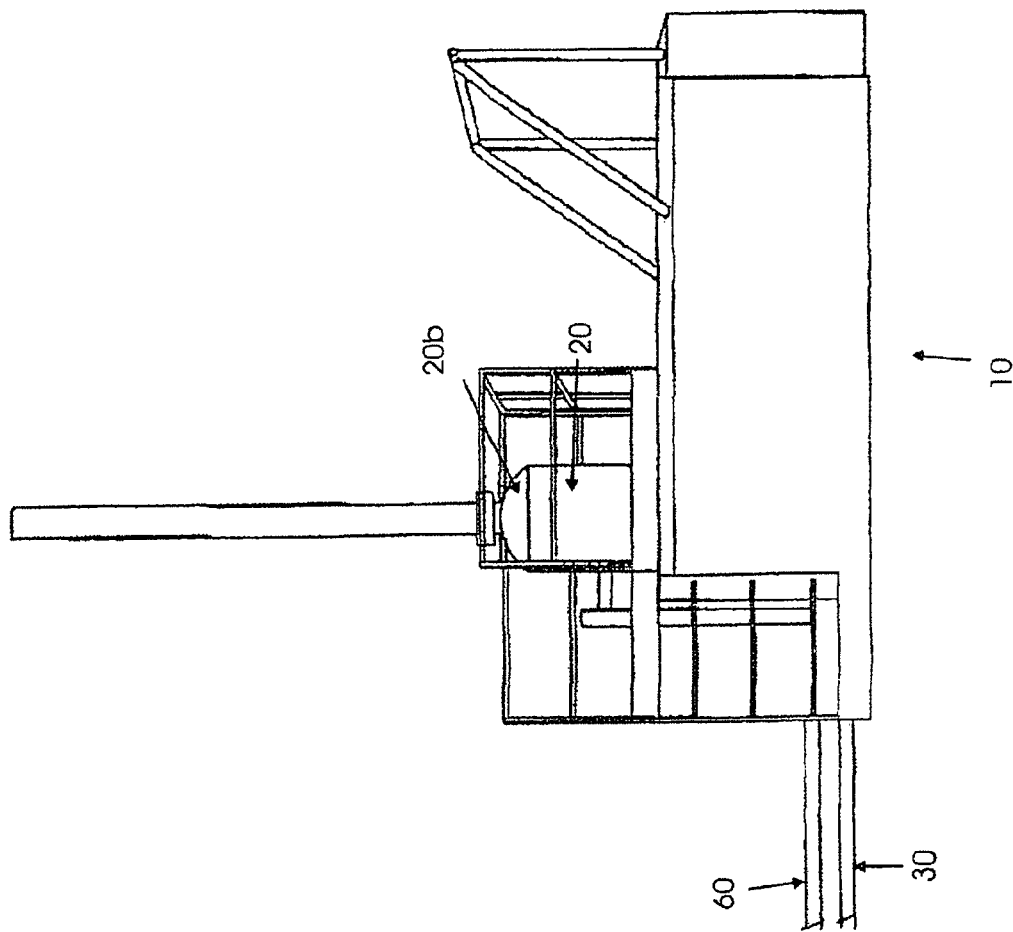
FIG. 1a, is a side elevation view of the portable degasser, flare tank and fluid storage system of the present invention in fluid communication with a blow-out control system mounted in a well-head.
Figure 1A:
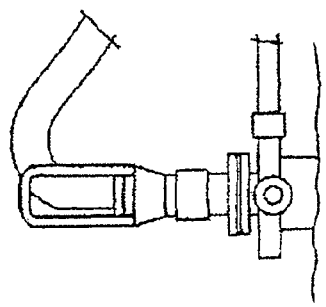
Figure 2:
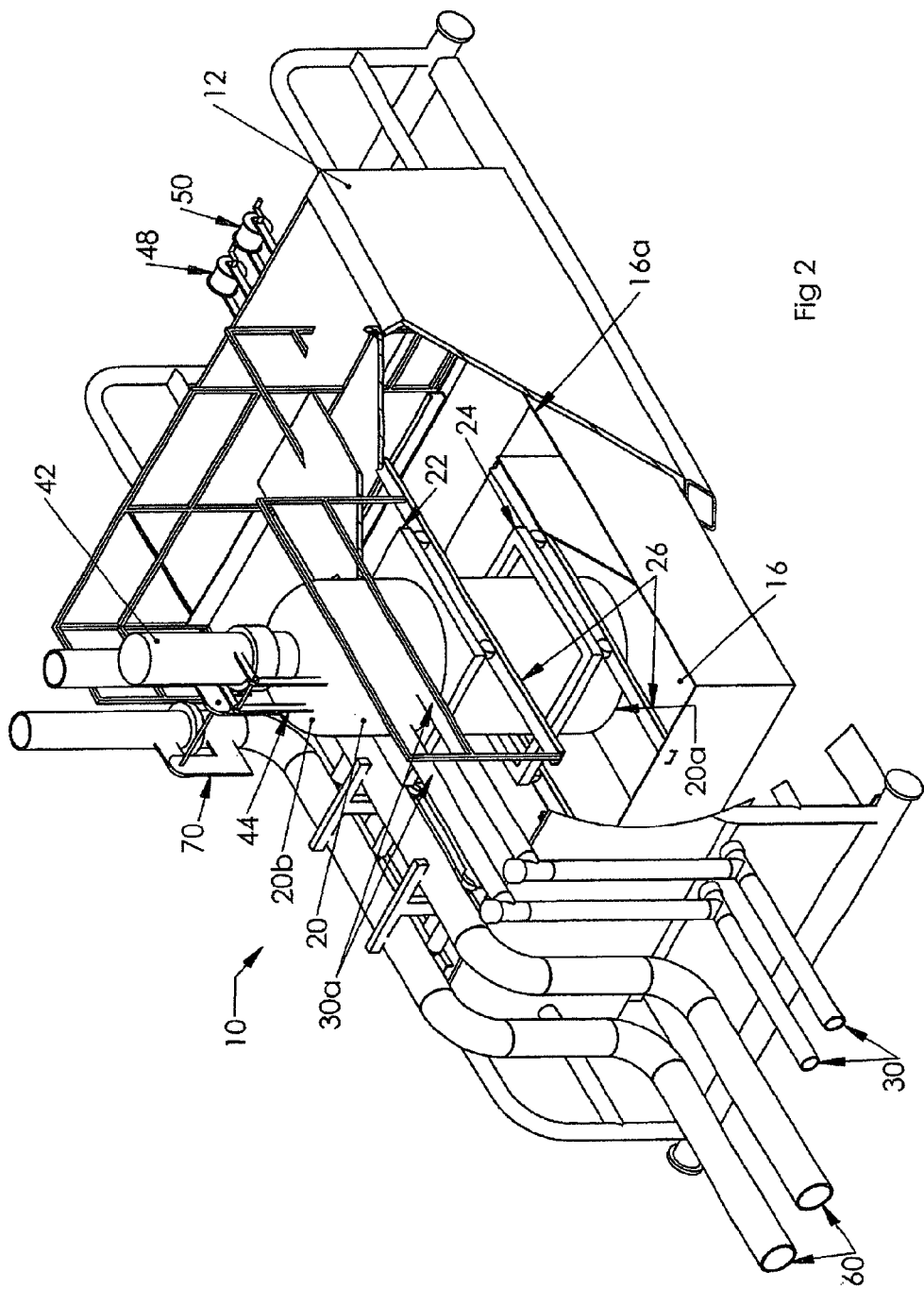
FIG. 2 is an enlarged, partially cut-away perspective view of the present invention.
Figure 3:
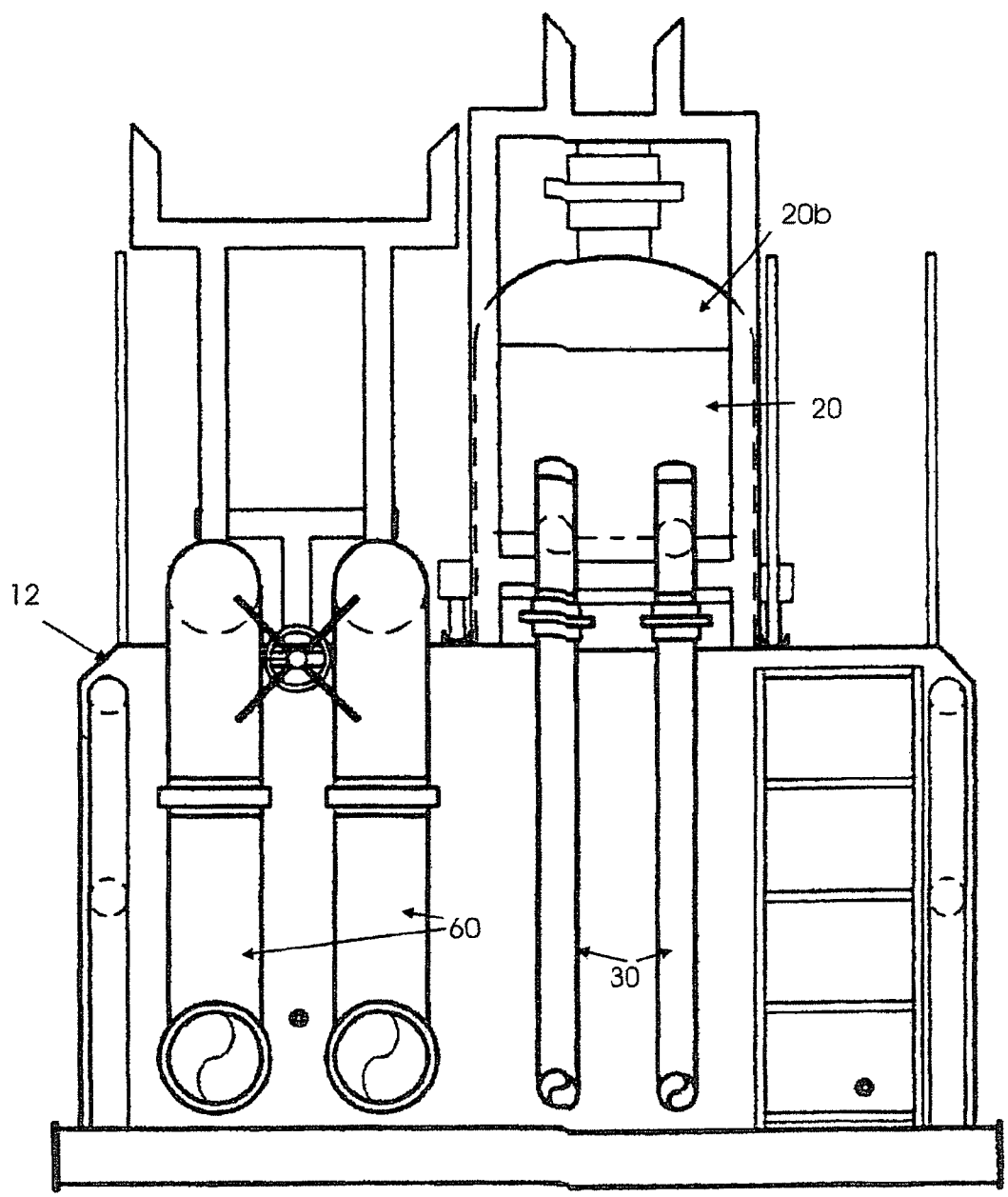
Figure 4:
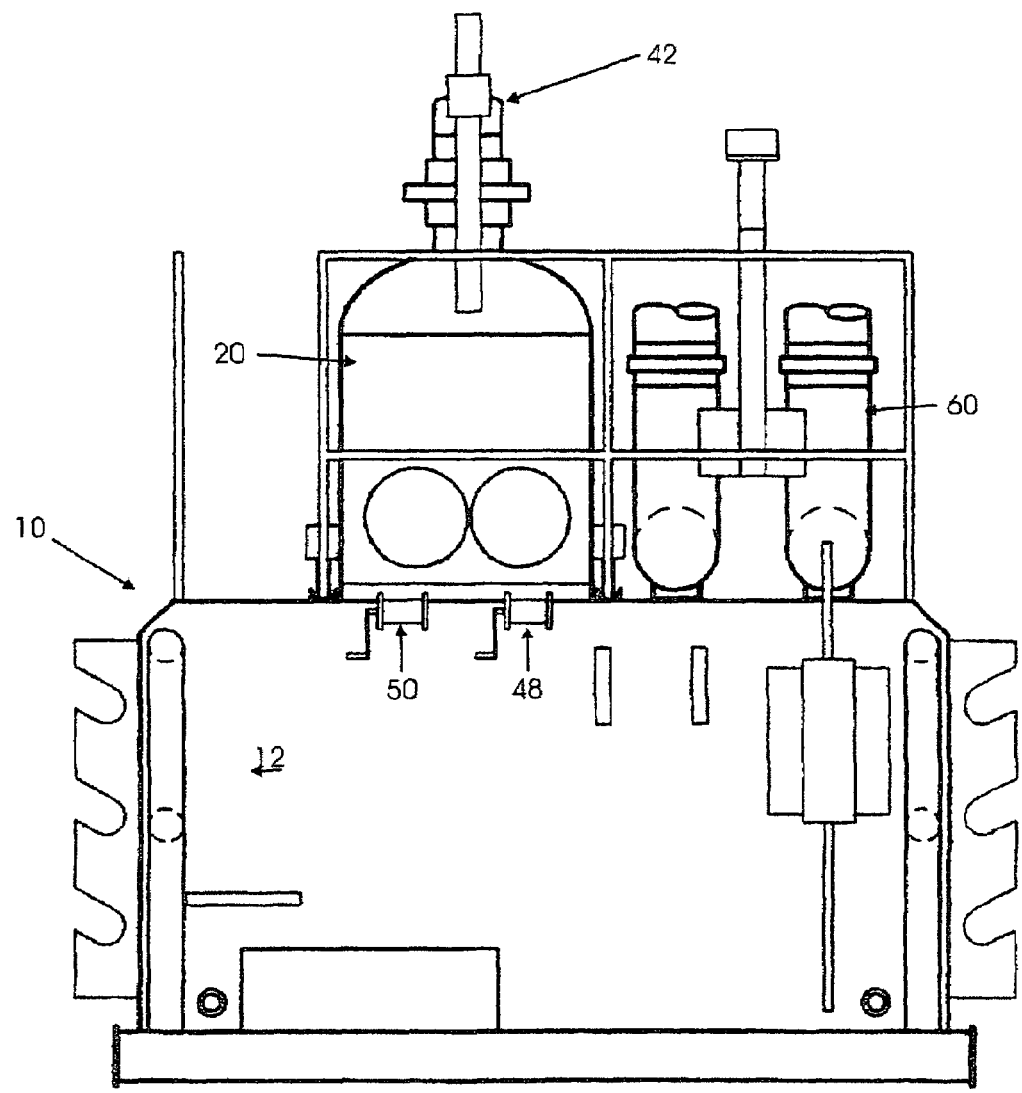

With reference to the drawing figures, wherein similar characters of reference denote corresponding parts in each view, the portable degasser, flare tank and fluid storage system 10 has a frame 12. An open-topped ejecta-receiving tank 16 is mounted in the bottom of frame 12.

A generally cylindrical degassing vessel 20 is mounted so as to be elongate vertically on upper and lower carriages 22 and 24 respectively, supported on rails 26. Rails 26 are mounted horizontally within frame 12. Vessel 20 has an open bottom 20a, which is suspended within tank 16, and in particular within upper opening 16a. Vessel 20 is movable relative to both frame 12 and tank 16 on carriages 22 and 24.

Figure 7:
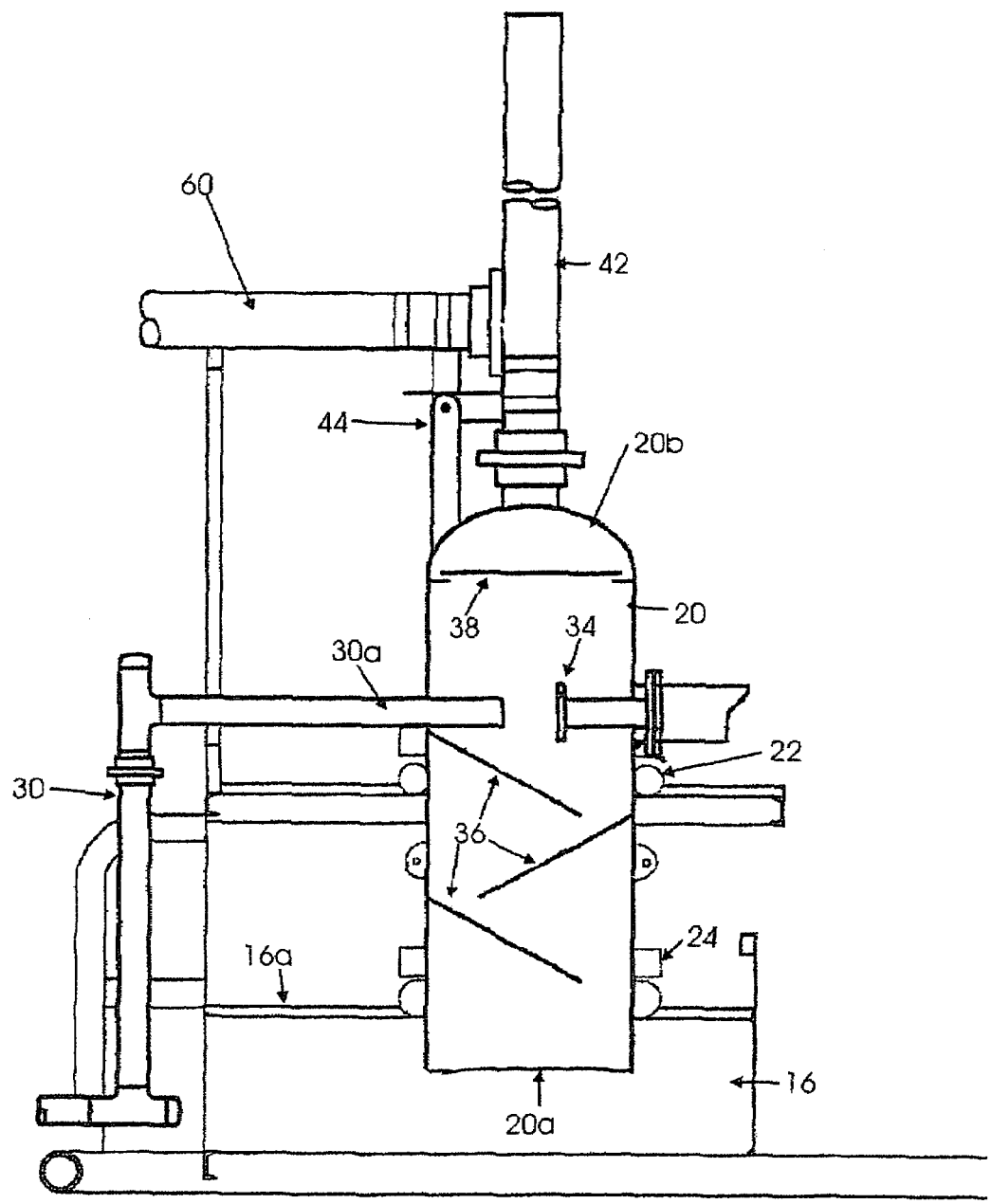
FIG. 7 is a vertical sectional view of the degassing tank.

Pipelines 30, which may conventionally be generally four inches in diameter, is connected at one end to fittings on blow-out control system 31 on a wellhead 32 on a drilling rig (not shown). Pipelines 30 carry a slurry of ejecta from a borehole during the drilling operation when a pocket of pressurized gas is encountered. The proximal ends 30a of pipelines 30 enter vessel 20, near its upper end 20b. The slurry enters vessel 20 under pressure and impacts blast plate 34, best seen in FIG. 7. Plate 34 inhibits damage to vessel 20. Baffles 36 within vessel 20 assist in removing entrained volatile gas from the slurry as it flows under force of gravity downwardly into tank 16. Condenser baffle 38 prohibits upward travel of liquid while permitting free upward passage of gas into the flare stack 42. Flare stack 42 is hingedly mounted as at 44 to the upper end 20b of vessel 20, permitting it to be collapsed for transportation.

Figure 5:
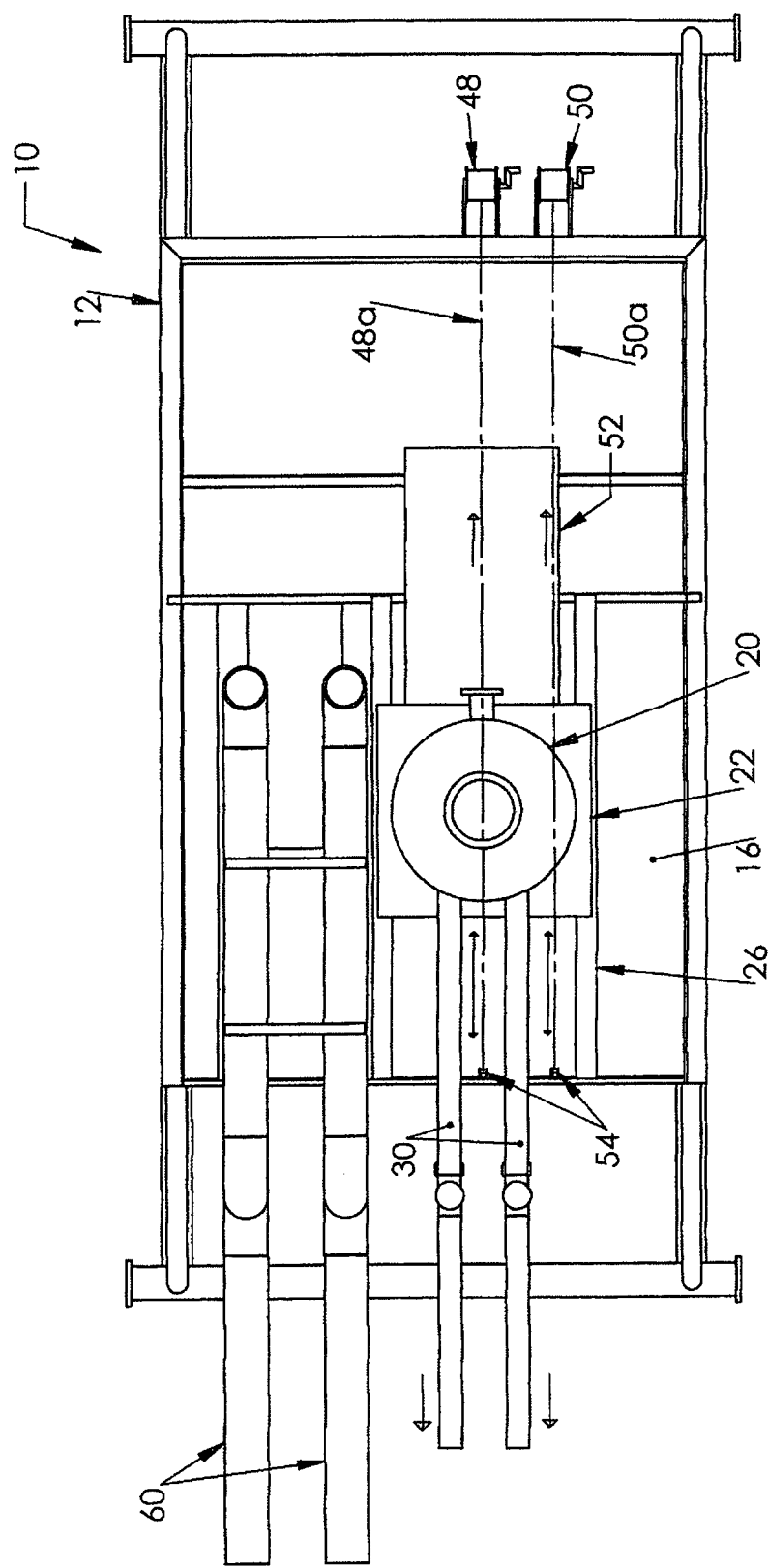
Figure 6:
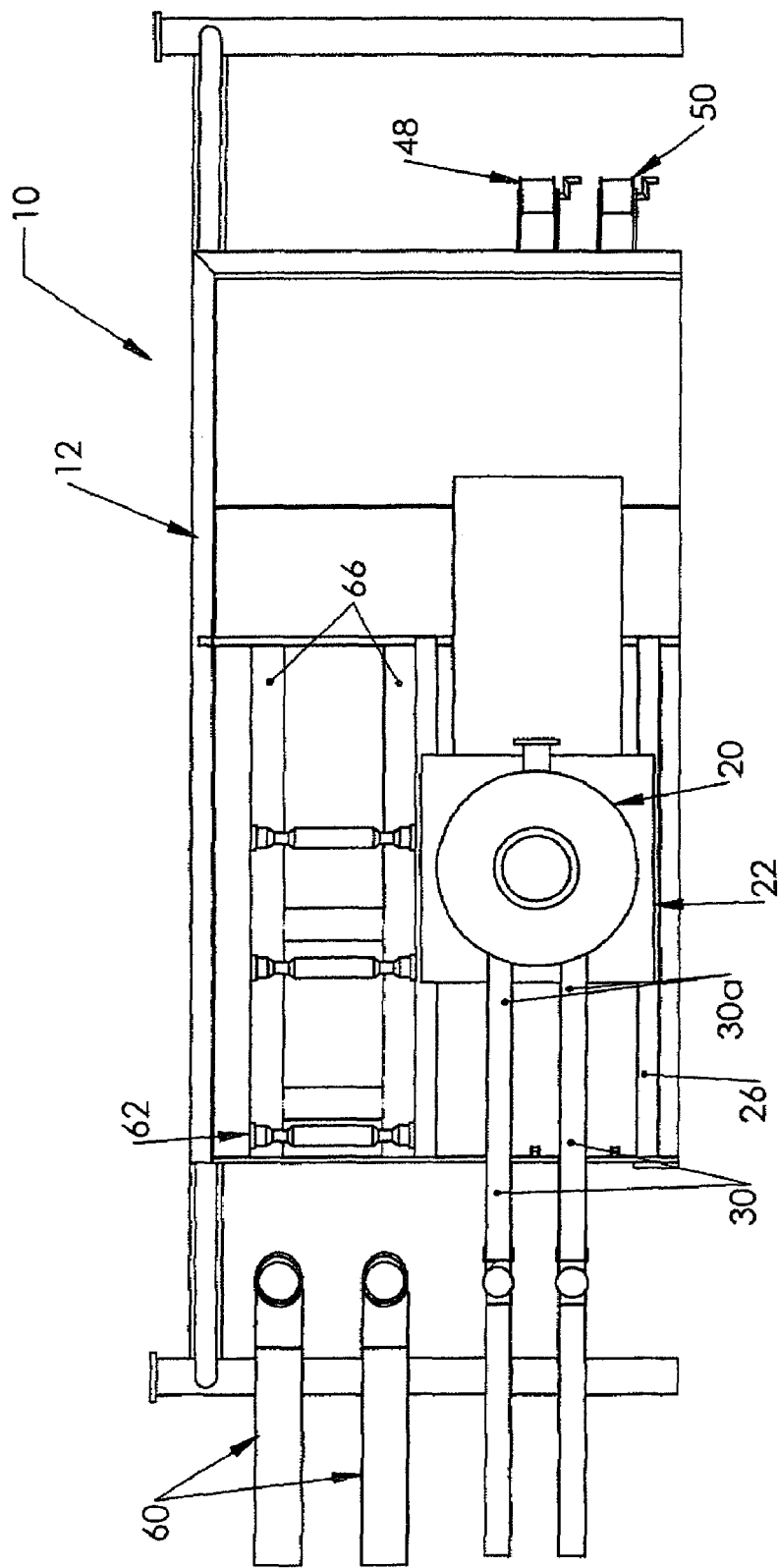

Actuation means, which in one form may be winches 48 and 50, as can be viewed in FIG. 5, is mounted to frame 12. The cable 48a extending from winch 48 is connected to the near side of vessel 20. Cable 50a extending from winch 50 passes through guide 52 and around pulleys 54 and is connected to the far side of vessel 20. Operation of the actuation means provides for translating vessel 20 and pipelines 30 back and forth along rails 26.

Return gas flare lines 60, which may be generally eight inches in diameter, may be connected to fittings on the blow-out control system on the drilling rig. Lines 60 are mounted to a movable carriage 62 mounted on rails 66. Rails 66 are mounted on frame 12. Movable carriage 62 is rigidly connected to upper carriage 22 so as to be reciprocally movable therewith.

Return gas flare lines 60 are hinged as at 70 permitting lines 60 to be collapsed for transportation.

In use the ejecta which collects in tank 16 has to be occasionally emptied. This may be accomplished by either pumping it out of the tank, by the use of drain plugs, by a combination of both of these or by other means known in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. For mounting to a pipe which itself is mounted to the blow-out outflow from a borehole so as to direct ejecta from the borehole into the pipe, a degasser system comprising:
   a rigid frame,
   an open-bottomed vessel mounted on said frame, said vessel having a lower open end, contiguously sealed sidewalls extending upwardly from said lower open end, and an enclosed vessel head mounted to so as to seal an upper end of said sidewalls, said vessel having an interior cavity defined by said sidewalls and said head,
   a stack mounted to and extending from said vessel head, said stack in fluid communication with said cavity so as to exhaust gas from said vessel,
   a pipe coupler mounted to said sidewalls adjacent said upper end thereof, said pipe coupler in fluid communication with said cavity and mountable to said pipe so as to direct the ejecta from the pipe, when said pipe coupler is mounted to the pipe, in an in-flow direction into said cavity, for flow of the ejecta along a flow path under force of gravity down through said vessel in a downward direction and so as to flow out through said lower open end,
   at least one baffle mounted to said sidewalls and in said cavity so as to partially occlude said cavity and so as to lie at least partially across said flow path, whereby the ejecta flowing along said flow path is degassed,
   a tank mounted under said vessel so as to receive the ejecta flowing from said lower open end of said vessel whereby the ejecta is stored in the tank for later removal and disposal,
   means for translating said pipe coupler and said vessel relative to said frame so as to thereby translate said pipe coupler for ease of mounting the pipe.

2. The device of claim 1 wherein said means for translating said pipe coupler and said vessel relative to said frame translates said vessel over, and relative to, said tank, and wherein said tank has an upwardly-open upper opening sized so that said vessel only translates over said opening.

3. The device of claim 2 wherein said frame includes rails and wherein said means for translating said pipe coupler and said vessel includes means for translating said vessel along said rails.

4. The device of claim 3 wherein said rails include a spaced apart pair of substantially horizontal rails mounted on opposite sides of said vessel.

5. The device of claim 4 wherein said means for translating said vessel along said rails includes rolling means mounted to said vessel for rolling along said rails.

6. The device of claim 5 wherein said vessel extends downwardly between said pair of substantially horizontal rails so as to dispose said lower open end below said rails.

7. The device of claim 6 wherein said tank has sidewalls defining said upper opening into said tank, and wherein said lower open end is disposed over said upper opening between said sidewalls.

8. The device of claim 7 wherein said vessel has a range of translatory motion along said rails extending substantially entirely across said upper opening into said tank.

9. The device of claim 8 further comprising a selective actuation means selectively actuable so as to selectively translate said vessel along said rails.

10. The device of claim 9 wherein said selective actuation means includes at least one elongate element cooperating between said vessel and a prime mover mounted to said frame.

11. The device of claim 10 wherein said elongate element includes at least one cable and said prime mover includes at least one winch mounted to one end of said cable, an opposite end of said cable mounted to said vessel.

12. The device of claim 11 wherein said cable is a loop so as to be double-acting actuator moving said vessel back and forth along said rails.

13. The device of claim 1 wherein said stack is pivotalby mounted over said head so as to be foldable between a stowed position adjacent said frame and a deployed position extending upwardly from said head.

14. The device of claim 12 wherein said pipe coupler is pivotable so as to pivot for ease of mounting to the pipe.

15. The device of claim 1 wherein said vessel is elongate and mounted in said frame so as to be elongate vertically, and wherein said at least one baffle is an array of baffles spaced apart along said flow path below said pipe coupler where mounted to said sidewalls and wherein said pipe coupler is mounted to said sidewalls adjacent said upper end of said sidewalls.

16. The device of claim 15 wherein said array of baffles include a plurality of baffles which are alternatingly mounted to opposite walls of said sidewalls and so as to be interleaved along said flow path alternatingly in opposed facing array.

17. The device of claim 16 further comprising a blast plate mounted in said vessel so as to be in an in-flow of the ejecta flowing in said in-flow direction from said pipe coupler so as to receive a blast force of the ejecta and to deflect the ejecta along said flow path.

18. The device of claim 17 wherein said pipe coupler, where it is mounted to said vessel, includes a substantially horizontal pipe extension extending through said sidewalls into said cavity.

19. The device of claim 18 wherein said plurality of baffles includes at least three alternatingly opposed-facing baffles interleaved so that distal ends of said baffles are interleaved along said flow path so that said flow path is circuitous through said baffles as the ejecta travels along said flow path through said array of baffles.

20. The device of claim 18 wherein said sidewalls are formed as an elongate cylinder extending from said head to said lower open end.

\* \* \* \* \*